United States Patent Office 3,188,907
Patented June 15, 1965

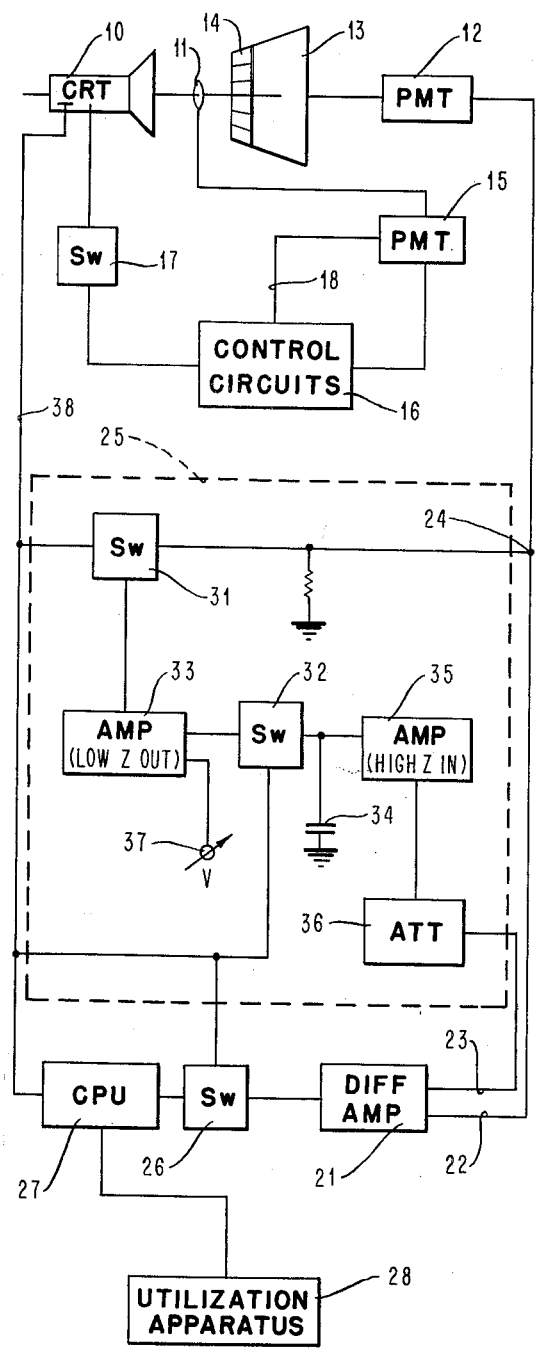
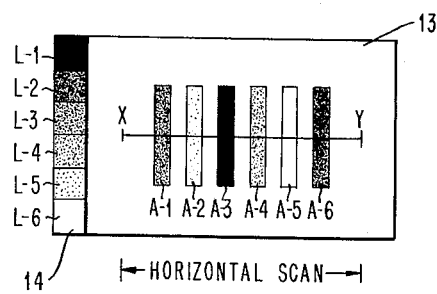
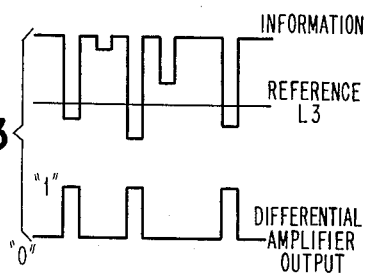
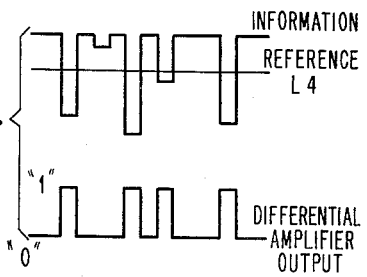
INVENTORS
KURT M. TRAMPEL
HANS H. JENSEN
BY John F. Opterndorf
ATTORNEY

3,188,907
OPTO-ELECTRICAL SCANNING SYSTEM FOR GRAY LEVEL DETECTION
Kurt M. Trampel and Hans H. Jensen, Poughkeepsie, N.Y., assignors to International Business Machines Corporation, New York, N.Y., a corporation of New York
Filed Nov. 27, 1962, Ser. No. 240,226
7 Claims. (Cl. 88—14)

This invention relates to opto-electrical information conversion systems. More particularly, it relates to a scanning system for transducing analog information codified as varying levels of light transmissivity into electrical signals convertible to digital form.

Existing opto-electrical information scanning systems are generally confined to two types. A first type performs on a go-no go basis and distinguishes black and white. The second category detects levels of gray but is restricted to distinguishing among a very limited number of gradations of gray. Scanning systems of the second type have been limited due to the lack of adequate photographic transparencies providing sufficient distinctiveness among the gradations of gray. Secondly, they have been limited by lack of a constant light source which is required by such systems for detecting levels of gray. Advances in the art have substantially alleviated these problems. However, detection of a greater number of levels of light transmissivity continues to be restricted due to the instability and drift of currently available transducing devices. This invention is intended to overcome this limitation.

Accordingly, it is a primary object of the invention to provide an opto-electrical information conversion system capable of detecting a much greater number of distinct levels of light transmissivity than heretofore possible with existing systems.

In existing systems, customary practice has required the utilization of two channels: a reference channel and an information channel. A comparison of the data in the two channels provided the go-no go indication. Each channel has contained its own transducing media, for example, a photomultiplier tube, for detecting the optically contained analog information and for converting it to an electrical signal. During the course of a particular scanning operation, the gain of the photomultiplier tubes has been unstable. Each tube has drifted with respect to the other and with respect to the entire scanning system. Additionally, the drift of the tubes over an extended period of time, for example a day, has been known to approach 30%. Consequently, the extent of gray level detection has been severely limited.

Thus, it is another object of the invention to provide an opto-electrical scanning system which substantially alleviates any problems normally occurring in such systems due to drift and instability of the transducing media.

It is another object of the invention to detect information stored in analog form as a plurality of levels of gray and to transduce this information for comparison with reference information to provide electrical signals capable of being utilized in digital manner.

A further object of the invention is to provide an opto-electrical scanning system capable of distinguishing among gradations of gray and to provide electrical indications thereof which are related to a particular reference level.

In accordance with an aspect of the invention, there is provided apparatus for scanning and correlating analog information contained on a photographic transparency in the form of varying levels of light transmissivity. The apparatus includes means for scanning the transparency. These means may be a cathode ray tube flying spot scanner having a constant light output. Transducing means are positioned with respect to the scanning means and the transparency to detect the modulated light signals produced by the transparency. A graduated standard scale of known light transmissivity areas is positioned with respect to the transparency. This permits both the graduated scale and the transparency to be scanned in the course of a particular scanning operation.

Operation of the system provides for the transducing means to produce an electrical signal indicative of the level of light transmissivity of a particular area of the graduated standard scale when scanned. This signal is stored and employed as a reference for comparison with a signal indicative of the information transduced from the transparency. Means for comparing the reference signal level and the information signal level are provided to indicate in digital form the relationship between them.

A feature of the invention provides for the use of a single transducing media, such as a photomultiplier tube, for detecting both the reference light level as well as the information light level thereby eliminating any problems normally occurring due to the relative drift between a transducer for reference information and a transducer for the scanned information.

Another feature of the invention provides for the detection and comparison of information codified as a plurality of levels of light transmissivity against any of a number of reference levels by utilizing a flying spot scanner producing a beam of constant light intensity in conjunction with a single transducing media.

The foregoing and other objects, features and advantages of the invention will be apperent from the following more particular description of the preferred embodiments of the invention, as illustrated in the accompanying drawings, wherein:

FIGURE 1 is a block diagram showing a scanning system embodying the principles of the invention;

FIGURE 2 is a transparency having a particular pattern of analog information and a reference scale for use in the system of FIGURE 1;

FIGURE 3 is a waveform diagram indicating the relationships among the electrical signals provided in the system of FIGURE 1 in response to one set of conditions; and, FIGURE 4 is a waveform diagram indicating the relationships among the electrical signals provided in the system of FIGURE 1 in response to a second set of conditions.

Referring now to FIGURE 1 a scanning system, according to the invention, comprises a source of constant light intensity, such as a cathode ray tube (CRT) 10. The tube 10 provides a flying spot of light which is directed through suitable optical means 11 for converging the rays of light toward a transducing device, such as a photomultiplier tube (PMT) 12. Interposed between CRT 10 and PMT 12 is a photographic transparency 13 having analog information contained on it. A reference scale 14 may form a part of the transparency 13 or it may be located just to the side of the transparency.

The cathode ray tube 10 is required to produce a beam of constant light intensity which may be controlled to scan across the transparency 13. In order to provide a constant intensity light beam, the optical means 11 can be employed to direct part of the light beam to a second photomultiplier tube (PMT) 15. PMT 15 produces an output signal which may be fed back to a suitable feedback circuit 16 having gain control and light intensity control circuits. Periodically, this feedback circuit may be connected to exercise control on the CRT 10 by actuating a suitable switch 17.

Circuit arrangements, such as that described, are well-known in the art and, therefore, this circuitry has been indicated in block form. These known arrangements for maintaining light intensity control also act to stabilize the PMT in the circuit. This is accomplished by maintaining a constant gain in the PMT (for example, through the connection 18).

The scanning system also comprises a differential amplifier 21 having two input terminals 22–23. Terminal 22 is directly connected to the common node 24 and to the output of PMT 12. The terminal 23 is coupled through a storage circuit, indicated generally at 25, to the node 24 and the PMT 12. The output of amplifier 21 is connected through a switch 26 to a central processing unit (CPU) or computer 27. CPU 27 is connected, in turn, to utilization apparatus 28.

Storage circuit 25 comprises switches 31–32 interconnected by a low output impedance amplifier circuit 33. Switch 31 is connected to node 24 and switch 32 is connected to a shunt capacitor 34 which is referenced to ground potential. Switch 32 and capacitor 34 are also connected through a high input impedance amplifier circuit 35, such as an emitter follower, and an attenuator 36 to the input terminal 23 of the differential amplifier. The circuit 25 is a conventional circuit which utilizes the technique of capacitor storage of information. Capacitor 34 stores the signal level provided by the PMT 12 in response to the scanning of one of the areas on the reference scale 14. Circuit 25 is arranged to have unity gain. It utilizes a variable voltage reference at 37 to compensate for any level shift in the circuit.

Although all of the switches 17, 26, 31, 32 are indicated in block form, it is readily apparent that they may be mechanical or electrical in nature. Preferably they would be transistor circuits operated in response to appropriate signals provided by CPU 27 through the connections 38. Similarly, signals from CPU 27 would be utilized to control the deflections of the flying spot produced by the CRT 10.

Operation of the scanning system occurs with the provision of a suitable signal by CPU 27 through connection 38 to close switches 31 and 32 and to open switch 26. Concurrently, CPU 27 also provides deflection signals to CRT 10 so that the light beam scans one of the areas of the reference scale 14. The modulated light beam is detected by PMT 12 which transduces this amount of light to a proportional electrical signal. This signal is stored in the capacitor 37. When the switches 31 and 32 are opened and switch 26 is closed, a discharge path is provided for capacitor 34 permitting the stored signal to be applied to differential amplifier 21. The rate of discharge of the capacitor is slow thereby permitting a lengthy scanning period of the analog information contained on the transparency 13. CPU 27 provides deflection signals to CRT 10 so that scanning of transparency 13 takes place. PMT 12 produces an electrical signal proportional to the amount of light passing through the transparency. This signal is applied directly at terminal 22 of differential amplifier 23. The differential amplifier produces an output signal any time that the signal indicative of the analog information is less than the signal indicative of the reference light level. The differential amplifier output signal is applied to CPU 27 and is codified in digital form. A binary "1" is equated with the signal level due to the analog information being less than the signal level indicative of the reference area and a binary "0" is indicative of the opposite condition.

Since the period of time required to scan both a reference area on the scale 14 and the analog information contained on the transparency 13 is relatively small (i.e., of the order of milliseconds the PMT 12 remains substantially constant during this period and the problem of drift normally encountered in other PMT scanning systems is alleviated. Moreover, the ratio of time to fully charge capacitor 34 to the time the capacitor discharges a small amount (for example, one percent) is of the order of 1:100. Thus, it is readily apparent that the analog information on the transparency may be scanned a substantial number of times for each scanning of a reference area.

Referring now to FIGURE 2 for consideration of the scanning operation in greater detail, a plurality of blocks A1–A6 of varying levels of gray are indicated on the transparency 13. Associated with the transparency 13 is a graduated scale of varying levels of light transmissivity or of gray 14. As already stated, this scale may form a part of the transparency 13 or it may be separated from it. As is apparent, each of the different areas of the scale 14 has a different light transmissivity, L1–L6.

For purposes of illustration, these levels are depicted by various degrees of stippling. The magnitude of the stippling is indicative of the level of gray, so that area L1 indicates an opaque area and area L6 is a totally transparent area. Although six such levels are shown in the reference scale, it is apparent that any number of such reference areas may be included. For ease of description, this number has been limited to six.

In similar manner, the information contained on the transparency 13 ranges in bevels of light transmissivity— from the opaque or black level to the transparent or white level. Although this information is shown in the form of blocks A1–A6 it is readily apparent that the analog information may be codified in other ways on such a transparency, e.g., a drawing having shadings to indicate contours of a particular article, or the portrait of an individual, or printing having various gradations of transparency.

Each of the six blocks A1–A6 has a different gradation of light transmissivity permitting more or less light to be passed to the PMT 12. Thus, block A3 is chosen to be completely black and, therefore, opaque to the passage of any light through the transparency. In contrast, the block A5 is completely transparent and passes all the light directed at it without modulating the light beam. The remaining blocks A1, A2, A4 and A6 have a degree of opaqueness between the opaque and transparent.

After a particular reference area L1–L6 is scanned and its degree of light transmissivity stored as an electrical signal in the capacitor, the transparency may be scanned between the points X and Y on a horizontal axis. As the spot of light traverses the blocks A1–A6, varying degrees of light are passed through the transparency to the PMT 12. The PMT produces an electrical signal directly proportional to the amount of light impinging on it. Therefore, for the block, A3, no signal at all is provided by a PMT and a for the block A5 a total or complete signal is provided. In similar manner, electrical signals are produced for the remaining blocks corresponding to the amount of light passed through that portion of the transparency to PMT 12. This signal is applied directly as one input to the differential amplifier. Concurrently, the capacitor 34 of the storage circuit 25 is discharging to provide a signal indicative of a reference area as the second input to the differential amplifier.

Comparison of the analog signal with the signal indicative of reference area L3 is shown in FIGURE 3. When both of these signals are applied to the differential amplifier, a binary "1" output signal is produced only when the analog signal indicates that the scanned information is darker than the transmissivity level of the reference area. As shown in the lower waveform of FIGURE 3, this occurs for the three times when the level of light transmissivity of the transparency 13 is less than the reference area chosen, i.e., level L3.

As a further illustration, FIGURE 4 indicates that the differential amplifier 21 produces a binary "1" output signal on four occasions. This occurs when the analog signal produced by the scanning of the transparency is compared with a signal indicative of reference area L4. In this instance, four of the six blocks on transparency 13 have areas of light transmissivity darker than the reference level. Thus, information has now been applied to the CPU 27 to indicate that the degree of grayness of block A4 lies between reference areas L3 and L4.

Although the analog information contained on a transparency or slide has been described as being compared with only two reference areas, it is readily apparent that this information could be compared with any of the six reference levels indicated on the graduated standard scale 14. In like manner, it is obvious that the number of reference areas could be substantially increased to provide a much greater number of gradations of gray between complete opaqueness and complete transparency. The scanning of the transparency would then provide a more exact determination of the information in the form of digital signals fed to the CPU.

The scanning of the transparency has been described only in relation to the horizontal displacement of a flying spot from the CRT 10. It is obvious that vertical scanning may be employed or, combined horizontal and vertical scanning can take place in a conventional manner. This scanning would be under the control of the CPU 27. Signals would be provided to the CRT 10 to control its horizontal and vertical deflections and, thus, the displacement of the flying spot. Simultaneously, the CPU would also control the opening and closing of the switches of FIGURE 1. Therefore, if a drawing or facsimile of some object or article was indicated in analog form on a transparency, scanning in both horizontal and vertical directions and comparing against a sufficient number of reference areas would provide the CPU with information sufficient to reproduce the drawing or actuate, in an appropriate manner, other circuitry, for example, the utilization apparatus 28.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. Opto-electrical apparatus for scanning and correlating information contained on a transparency in the form of areas of different light transmissivity, comprising
    light means for scanning the transparency,
    an opti-electrical transducer positioned to respond to the light modulations obtained from the transparency to produce electrical signals in accordance with the information contained on the transparency,
    a standard scale of known light transmissivity areas, said transducer producing an electrical signal indicative of a particular reference area of light transmissivity when one of said areas of the scale is scanned by said light means,
    means for storing the signal indicative of a reference area, and
    means for comparing the signal indicative of a reference area and signals indicative of the transparency information to provide an indication of the relationship between them.

2. Opto-electrical apparatus for scanning and correlating information contained on a transparency in the form of areas of different light transmissivity, comprising
    light means for scanning the transparency,
    transducing means positioned to respond to the light modulations obtained from the transparency to produce electrical signals in accordance with said information,
    a standard scale of known light transmissivity areas, said transducing means producing an electrical signal indicative of a particular reference area of light transmissivity when one of said areas of the scale is scanned by said light means,
    means for storing the signal indicative of a reference area, and
    means for comparing the signal indicative of a reference area and signals indicative of the transparency information to provide an indication of the relationship between them.

3. The apparatus of claim 2, wherein said light means comprises a light beam of constant intensity.

4. The apparatus of claim 2, wherein the comparing means comprises difference determining means for accepting the signal indicative of the reference area and signals indicative of the transparency information to produce an output signal only when the relationship between the signals indicates that the scanned information is darker than the scanned reference area.

5. The apparatus of claim 2, wherein the standard scale comprises a plurality of gradations of light transmissivity extending from an opaque or black area through a multiple number of different gray areas to a transparent or white area.

6. Opto-electrical apparatus for scanning and correlating information contained on a transparency in the form of areas of different light transmissivity, comprising
    a light beam source of constant intensity for scanning the transparency,
    transducing means positioned to respond to the light modulations obtained from the transparency to produce electrical signals indicative of the information contained on the transparency,
    a graduated standard scale of known light transmissivity areas ranging from an opaque area through a multiple number of different gray areas to a transparent area, said transducing means producing an electrical signal indicative of a particular reference area of light transmissivity when one of said areas of the scale is scanned by said light means,
    means for storing the signal indicative of a reference area, and
    comparator means for accepting the signal indicative of a reference area and signals indicative of the transparency information to provide an indication of the relationship between them.

7. The apparatus of claim 6, wherein said transducing means comprises a single transducer for responding to both the scanning of a reference area and the modulations from the transparency.

References Cited by the Examiner

UNITED STATES PATENTS

| | | | |
|---|---|---|---|
| 3,064,249 | 11/62 | Forbath et al. | 235—181 |
| 3,072,889 | 1/63 | Willcox | 340—173 |

MALCOLM A. MORRISON, *Primary Examiner.*